3,629,429
THIADIAZOLYL UREAS AS SYSTEMIC
FUNGICIDES
Patrick R. Driscoll, Spotswood, N.J., assignor to
Mobil Oil Corporation
No Drawing. Filed Aug. 1, 1969, Ser. No. 846,933
Int. Cl. A01n 9/12, 9/22
U.S. Cl. 424—270     5 Claims

ABSTRACT OF THE DISCLOSURE (Substituted)thio-, such as alkylthio- and alkenylthio-substituted 1,3,4-thiadiazol-2-yl ureas are active systemic fungicides.

BACKGROUND OF THE INVENTION

Field of the invention

This invention is directed to the use of certain thiadiazol-2-yl ureas as systemic fungicides.

Description of the prior art

In a copending application Ser. No. 818,078, filed Apr. 21, 1969, now abandoned, in the name of the present inventor, Patrick R. Driscoll, and entitled, "Thiadiazole Ureas and Their Use as Herbicides," there are disclosed and claimed a wide variety of substituted thiadiazolyl ureas, including those utilized herein. These compounds are disclosed therein as new compounds useful as herbicides. It is the discovery of this invention that certain of these compounds are systemic fungicides.

SUMMARY OF THE INVENTION

This invention provides a method for the systemic control of plant fungi that comprises applying to the locus in which said control is desired a compound having the formula:

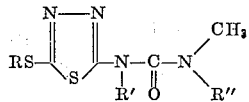

wherein R is alkyl ($C_1$–$C_6$), alkenyl ($C_1$–$C_6$), cycloalkyl ($C_3$–$C_6$), cyanoalkyl ($C_1$–$C_4$), thiocyanoalkyl ($C_1$–$C_4$), cyano, chloroalkyl ($C_1$–$C_4$), epoxyalkyl ($C_2$–$C_6$), phenylalkyl ($C_1$–$C_4$), methoxycarbonylalkyl ($C_1$–$C_4$), methoxycarbonyl, benzoylalkyl ($C_1$–$C_4$), acetylalkyl ($C_1$–$C_4$), or dialkyl ($C_1$–$C_4$) carbamoyl, R' is hydrogen or alkyl ($C_1$–$C_4$), and R" is hydrogen or methyl.

DESCRIPTION OF SPECIFIC EMBODIMENTS

The compounds having systemic fungicidal activity in accordance with this invention are 1-methyl-3-(5-alkyl or alkenyl thio-1,3,4-thiadiazol-2-yl) ureas which can also contain a 3-alkyl substituent. Non-limiting examples of these compounds are:

1-methyl-3-(5-methylthio-1,3,4-thiadiazol-2-yl) urea;
1,3-dimethyl-3-(5-methylthio-1,3,4-thiadiazol-2-yl) urea;
1-methyl-3-(5-propylthio-1,3,4-thiadiazol-2-yl) urea;
1-methyl-3-(5-isopropylthio-1,3,4-thiadiazol-2-yl) urea;
1,3-dimethyl-3-(5-propylthio-1,3,4-thiadiazol-2-yl) urea;
1-methyl-3-(5-isobutylthio-1,3,4-thiadiazol-2-yl) urea;
1-methyl-3-(5-butylthio-1,3,4-thiadiazol-2-yl) urea;
1-methyl-3-(5-amylthio-1,3,4-thiadiazol-2-yl) urea;
1,3-dimethyl-3-(5-hexylthio-1,3,4-thiadiazol-2-yl) urea;
1,3-dimethyl-3-(5-vinylthio-1,3,4-thiadiazol-2-yl) urea;
1-methyl-3-(5-allylthio-1,3,4-thiadiazol-2-yl) urea;
1-methyl-3-(5-propenylthio-1,3,4-thiadiazol-2-yl) urea;
1-methyl-3-(5-pentenylthio-1,3,4-thiadiazol-2-yl) urea;
1-methyl-3-(5-hexenylthio-1,3,4-thiadiazol-2-yl) urea;
1,1,3-trimethyl-3-(5-propylthio-1,3,4-thiadiazol-2-yl) urea;
1-methyl-3-(5-epoxypropylthio-1,3,4-thiadiazol-2-yl) urea;
1-methyl-3-[5-(3-chloropropylthio)-1,3,4-thiadiazol-2-yl] urea;
1-methyl-3-(5-thiocyanato-1,3,4-thiadiazol-2-yl) urea;
1-methyl-3-[5-(3-cyanopropylthio)-1,3,4-thiadiazol-2-yl] urea;
1-methyl-3-ethyl-3-(5-propylthio-1,3,4-thiadiazol-2-yl) urea;
1,1-dimethyl-3-ethyl-3-(5-propylthio-1,3,4-thiadiazol-2-yl) urea; and
1-methyl-3-(5-dimethylcarbamoylthio)-1,3,4-thiadiazol-2-yl) urea.

The compounds utilizable in this invention are prepared in three steps, utilizing well-known techniques. In the first step, 2-amino-5-mercapto-1,3,4-thiadiazole (M.P. 234° C.) is produced by reacting carbon disulfide with thiosemicarbazide in dimethylformamide at 90° C. for two hours (see British 726,045). In the second step, the substituted-thio derivative is prepared by alkylating the mercapto group of 2-amino-5-mercapto-1,3,4-thiadiazole with a bromide of the desired substituent group in the presence of a base, such as sodium hydroxide or pyridine. Typical bromides used in preparing various substituted-thio derivatives are alkyl bromide, alkenyl bromide, cyanoalkyl bromide, bromoacetone, phenacyl bromide, methyl bromoacetate, phenylalkyl bromide, and cyanogen bromide. In the third step, the substituted urea is prepared by reacting the 2-amino-5-substituted-thio-1,3,4-thiadiazole with methyl isocyanate.

2-alkylamino-5-mercapto-1,3,4-thiadiazole is prepared by reacting 4-alkylthiosemicarbazide with carbon disulfide in dimethylformamide at 90° C. for two hours. The second and third steps are as aforedescribed. Thus, in the case of 4-methylthiosemicarbazide, for example, the final product can be a 1,3-dimethyl-3-(5-alkylthio-1,3,4-thiadiazol-2-yl) urea.

EXAMPLE 1

1-methyl-3-(5-n-propylthio-1,3,4-thiadiazol-2-yl) urea 2-amino-5-n-propylthio-1,3,4-thiadiazole (5.0 g., 0.03 mole, M.P. 112–114° C.), prepared by alkylating 2-amino-5-mercapto-1,3,4-thiadiazole with 1-bromo-propane, was slurried with acetone (50 ml.) in a 125 ml. pressure bottle. Methyl isocyanate (1.8 g., 0.032 mole) was added and the mixture was heated in a steam bath for 2½ hours. The bottle was cooled in an ice bath and a white solid separated. The white solid was filtered and dried in a vacuum oven at 60° C. The solid weighed 5.4 g. (yield 78%), M.P. 173–175° C. The IR and NMR spectra supported the proposed structure. The 2-amino-5-mercapto-1,3,4-thiadiazole (M.P. 234° C.) was prepared by reaction of carbon disulfide with thiosemicarbazide in dimethylformamide at 90° C. for two hours.

EXAMPLES 2 THROUGH 11

Using the procedure described in Example 1 with the appropriate 5-position substituent there were prepared:

(2) 1-methyl-3-(5-allylthio-1,3,4-thiadiazol-2-yl) urea (M.P. 171–172° C.), starting amine M.P. 116–118° C.
(3) 1-methyl-3-(5-isobutylthio-1,3,4-thiadiazol-2-yl) urea (M.P. 142–144° C.), starting amine M.P. 140–141° C.
(4) 1-methyl-3-(5-n-butylthio-1,3,4-thiadiazol-2-yl) urea (M.P. 154–156° C.), starting amine M.P. 119–121° C.
(5) 1-methyl-3-[5-(3-cyanoethylthio)-1,3,4-thiadiazol-2-yl] urea (M.P. 168–170° C.).
(6) 1-methyl-3-(5-acetylmethylthio-1,3,4-thiadiazol-2-yl) urea (M.P. 166–168° C.).

(7) 1-methyl-3-(5-benzoylmethylthio-1,3,4-thiadiazol-2-yl urea (M.P. 177–179° C.).
(8) 1-methyl-3-(5-methoxycarbonylthio-1,3,4-thiadiazol-2-yl) urea (M.P. 153–155° C.).
(9) 1-methyl-3-(5-cyanomethylthio-1,3,4-thiadiazol-2-yl) urea (M.P. 209–210° C.).
(10) 1-methyl-3-(5-phenylmethylthio-1,3,4-thiadiazol-2-yl) urea (M.P. 168–169° C.).
(11) 1-methyl-3-[5-(3-methylpenten-2-ylthio)-1,3,4-thiadiazol-2-yl] urea (M.P. 131–133° C.).

Systemic leaf rust test.—Five (5) Wakeland wheat seeds are planted in each 2" diameter clay pot containing pure sand. The pots are placed in a greenhouse to germinate and grow for five days.

When the plants are five days old, the following procedure is followed:

Weigh out 12.5 mg. of the candidate compound on the analytical balance. Add four drops of Tween 20 over the compound, stir, and add 10 ml. of acetone. Take 1 ml. of the above and add 29 ml. of water giving a 10 p.p.m. portion of the chemical in the soil to be drenched. Four 15 ml. of the formulation on each of two 2" pots.

Plants are inoculated forty-eight hours after treatment by wetting the foliage late in the afternoon and dusting the foliage with wheat leaf rust spores (*Puccinia rubigovera tritici*). Plants are placed immediately in the humidity (dew) chamber and held overnight. Plants are removed at 10:00 A.M. the following morning and placed in the greenhouse.

Method of recording results.—Disease severity is determined ten days after returning the plants to the greenhouse and rated for percent disease reduction.

Compounds of Examples 1 through 4 were subjected to the aforedescribed test at 10 p.p.m. and at 7.5 p.p.m. concentration. The results are set forth in the table.

TABLE

| Example | Percent disease reduction | |
|---|---|---|
| | 10 p.p.m. | 7.5 p.p.m. |
| 1 | 100 | 100 |
| 2 | 100 | 0 |
| 3 | 100 | 100 |
| 4 | 100 | 0 |

The compounds of this invention have been found to exhibit considerable biological activity and are especially potent systemic fungicides. These compounds may be used in various ways to achievve biological action. They can be applied per se, as solids or in vaporized form, but are preferably used as the toxic components in fungicidal compositions of the compound and a carrier. The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers, and the like. A wide variety of liquid and solid carriers can be used in the fungicidal compositions. Non-limiting examples of liquid carriers include; organic solvents, such as alcohols, ketones, amides, and esters; mineral oils such as kerosene, light oils, medium oils, and vegetable oils such as cottonseed oil. Non-limiting examples of solid carriers include talc, bentonite, diatomaceous earth, pyrophyllite, fullers earth, gypsum, flours derived from cotton seeds and nut shells, and various natural and synthetic clays having a pH not exceeding about 9.5.

The amount of the compounds of this invention utilized in fungicidal compositions will vary rather widely. It depends to some extent upon the type of composition in which the material is being used, the nature of the condition to be controlled, and the method of application (i.e., spraying, dusting, etc.). In the ultimate fungicidal composition, as applied in the field, fungicide concentrations as low as 0.001 weight percent of the total composition can be used. In general, compositions, as applied, containing about 0.001 weight percent (10 p.p.m.) fungicide in either liquid or solid carrier give excellent results. In some cases, however, stronger dosages may be required.

In practice, fungicidal compositions are usually prepared in the form of concentrates, which are diluted in the field to the concentration desired for application. For example, the concentrate can be a wettable powder containing large amounts of a compound of this invention, and a carrier (e.g., attapulgite or other clay), and wetting and dispersing agent. Such a powder can be diluted prior to application, by dispersing it in water to obtain a sprayable suspension containing the concentration of fungicide desired for application. Other concentrates can be solutions that can be later diluted, e.g., with kerosene. Thus, it is within the contemplation of this invention to provide fungicidal compositions containing up to about 80 percent, by weight of the composition, of a fungicidal compound of this invention. Accordingly, depending upon whether it is ready for application, or it is in concentrated form, the contemplated fungicidal compositions contain between about 0.0001 percent and about 80 percent, by weight of the composition, of a fungicidal compound of this invention, and a carrier, liquid or solid as defined hereinbefore.

Although the present invention has been described with preferred embodiments, it is to be understood that modifications and variations may be resorted to, without departing from the spirit and scope of this invention as those skilled in the art will readily understand. Such variations and modifications are considered to be within the purview and scope of the appended claims.

What is claimed is:

1. A method for the systemic control of plant fungi which comprises applying to the soil in which said control is desired, an effective fungicidal amount of a compound having the formula:

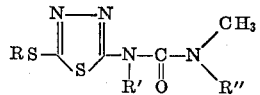

wherein R is $C_1$–$C_6$ alkyl, $C_1$–$C_6$ alkenyl, $C_1$–$C_6$ cyanoalkyl, cyano, $C_1$–$C_4$ chloroalkyl, $C_2$–$C_6$ epoxyalkyl, $C_1$–$C_4$ phenylalkyl, methoxycarbonyl, $C_1$–$C_4$ benzoylalkyl, $C_1$–$C_4$ acetylalkyl, or $C_1$–$C_4$ dialkyl carbamoyl, R' is hydrogen or $C_1$–$C_4$ alkyl, and R" is hydrogen or methyl.

2. The method of claim 1, wherein said compound is 1-methyl-3-(5-n-propylthio-1,3,4-thiadiazol-2-yl) urea.

3. The method of claim 1, wherein said compound is 1-methyl-3-(5-allylthio-1,3,4-thiadiazol-2-yl) urea.

4. The method of claim 1, wherein said compound is 1-methyl-3-(5-isobutylthio-1,3,4-thiadiazol-2-yl) urea.

5. The method of claim 1, wherein said compound is 1-methyl-3-(5-n-butylthio-1,3,4-thiadiazol-2-yl) urea.

References Cited

UNITED STATES PATENTS 3,287,463  11/1966  Rufenacht _____ 424—270
3,337,575  8/1967  Boesch et al. _____ 424—270

OTHER REFERENCES

Exmili et al.: "Chem. Abstracts," vol. 68 (1968), p. 2863m.

STANLEY J. FRIEDMAN, Primary Examiner

V. D. TURNER, Assistant Examiner